(12) United States Patent
Knobl et al.

(10) Patent No.: US 7,039,708 B1
(45) Date of Patent: May 2, 2006

(54) APPARATUS AND METHOD FOR ESTABLISHING COMMUNICATION IN A COMPUTER NETWORK

(75) Inventors: Karl-Heinz Knobl, Gückingen (DE); Christof Menzenbach, Wetzlar (DE); Wolfgang G Eibach, Holzgerlingen (DE); Mark Patrick Nuttall, Chandlers Ford (GB); Robert William Phippen, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,836

(22) Filed: Aug. 31, 1999

(30) Foreign Application Priority Data

Sep. 12, 1998 (GB) .................................... 9820151

(51) Int. Cl.
*G06F 15/16* (2006.01)
(52) U.S. Cl. ...................................... 709/227; 709/203
(58) Field of Classification Search ............... 709/227, 709/203, 219, 106, 228, 237, 217, 229, 232
See application file for complete search history.

(56) References Cited

U.S. PATENT DOCUMENTS

| | | | | |
|---|---|---|---|---|
| 5,155,689 A | * | 10/1992 | Wortham ..................... | 455/456 |
| 5,642,515 A | * | 6/1997 | Jones et al. .................. | 395/727 |
| 5,675,507 A | | 10/1997 | Bobo ..................... | 364/514 R |
| 5,732,074 A | * | 3/1998 | Spaur et al. ................. | 370/313 |
| 5,754,830 A | * | 5/1998 | Butts et al. .................. | 395/500 |
| 5,790,800 A | * | 8/1998 | Gauvin et al. ......... | 395/200.57 |
| 5,790,977 A | * | 8/1998 | Ezekiel ........................ | 702/127 |
| 5,801,940 A | * | 9/1998 | Russ et al. ................... | 700/276 |
| 5,805,803 A | * | 9/1998 | Birrell et al. .......... | 395/187.01 |
| 6,249,873 B1 | * | 6/2001 | Richard et al. .............. | 713/156 |
| 6,263,268 B1 | * | 7/2001 | Nathanson .................... | 701/29 |
| 6,356,761 B1 | * | 3/2002 | Huttunen et al. ........... | 455/414 |
| 6,356,934 B1 | * | 3/2002 | Delph ........................ | 709/204 |

(Continued)

FOREIGN PATENT DOCUMENTS

EP    0 813 325    12/1997

(Continued)

OTHER PUBLICATIONS

Kennedy, P: "MobileWebchanging the Face of Mobile Networking Through Universal Wireless Connectivity", Northcon Conference Record, US, New York, IEEE, Nov. 4, 1996, pp. 89-94, XP002128907, ISBN: 0-7803-3278-4 *The whole Document*.

*Primary Examiner*—Ario Etienne
*Assistant Examiner*—Barbara Burgess
(74) *Attorney, Agent, or Firm*—Hoffman, Warnick, & D'Alessandro, LLC; Jerry W. Herndon

(57) ABSTRACT

Provided are apparatus and a method for establishing communications between a Web client computer in a vehicle and a Web server computer connected to the Internet or an intranet, initiated from a remote Web Browser. The Web Browser sends a request to the server, which invokes a process at the server causing a SMS message to be sent to a telephone connected to the client computer. This SMS message includes an identification of the server process (such as a URL) and causes the client computer to establish communications with the server. This allows the Browser to interact with the client computer via a standard Browser request without the overheads of security exposure of requiring the client to be a Web server. The invention is useful for allowing a remote Browser to interact with a computer controlling a vehicle's electronic control systems.

19 Claims, 2 Drawing Sheets

U.S. PATENT DOCUMENTS 6,460,083 B1 * 10/2002 Niwa et al. .................. 709/227
6,556,241 B1 * 4/2003 Yoshimura et al. .... 348/211.99

FOREIGN PATENT DOCUMENTS

| GB | 2 323 757 | 9/1998 |
| WO | WO 98/59506 | 12/1998 |
| WO | 9909766 | 2/1999 |
| WO | WO 99/09766 * | 2/1999 |
| WO | 9922576 | 5/1999 |

* cited by examiner

APPARATUS AND METHOD FOR ESTABLISHING COMMUNICATION IN A COMPUTER NETWORK

FIELD OF INVENTION

The present invention relates to apparatus and a method for establishing communications between a client computer and a server computer via a network such as the Internet or an intranet, the establishment of communications being initiated from a second client computer remote from the first client computer.

BACKGROUND OF THE INVENTION

The present invention is well adapted to use Internet communications. As is well known, the Internet is a network of computer networks having no single owner or controller and including large and small, public and private networks, and in which any connected computer running Internet Protocol software is, subject to security controls, capable of exchanging information with any other computer which is also connected to the Internet. This composite collection of networks which have agreed to connect to one another relies on no single transmission medium (for example, bidirectional communication can occur via satellite links, fiberoptic trunk lines, telephone lines, cable TV wires and local radio links).

The World Wide Web Internet service ('Web' hereafter) is a wide area information retrieval facility which provides access to an enormous quantity of network-accessible information. Information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994). Use of the Web is growing at an explosive rate because of its combination of flexibility, portability and ease-of-use, coupled with interactive multimedia presentation capabilities. The Web allows any computer connected to the Internet and having the appropriate software and hardware configuration to retrieve any document that has been made publicly available anywhere on the Internet. The retrievable documents on the Web include 'HyperMedia' documents—i.e. documents which may be text documents or other forms of media such as sounds and images and which may have links ('hyperlinks'—see below) to other documents. The format of such documents on the Web is a standard format in HTML (HyperText Markup Language), such that a document created on one operating system and hardware platform can be read by a user on any other platform that has an appropriate Web Browser (see below). HTML is associated with a specific communication protocol known as HyperText Transfer Protocol (http). Images may be stored in separate graphics files, for example in standard GIF or JPEG format, which are referenced in the HTML text for retrieval with the HTML text.

Users access this information using a 'Web Browser', which is software installed on the user's computer having facilities for connecting to a Web server via the Internet and for retrieving documents from the Web server and presenting them. A Web server in this context is a computer program which provides services (serving requested HTML pages or files) in response to requests from other 'client' computer programs; a Web server computer is a computer running a Web server program. Currently available Web Browsers include Netscape Navigator from Netscape Communications Corporation and Internet Explorer from Microsoft Corporation. Such Browsers understand HTML and other Web standard formats and can display or output files correctly in these formats. The Web is structured as pages or files which each have a particular Universal Resource Locator (or URL). The URL is an address reference which denotes, amongst other things, both the server machine and the particular file or page on that machine. A user can type in particular URLs or jump from one page to an associated page by means of 'hyperlinks'—that is, a word or symbol on a page can be associated with a URL for another page which is selectable to cause the Browser to send a request which retrieves, and then to display, the relevant page. The preferred user interface for such Browser selection is the graphical 'point-and-click' interface (i.e. links are selected by moving a cursor to a particular word or symbol on a display and then pressing a mouse button). The words, images and symbols having associated hyperlinks are identifiable by a user as "hot spots" (for example, the relevant text may be highlighted or underlined, or the cursor may change its appearance as it passes over the hot spots). There may be many pages resident on a single server, and associated hyperlinked pages may be located on different servers.

Web pages are thus well known to be identifiable through URLs, such as http://www.pc.ibm.com/data.htm. This example illustrates three components of the URL: "http" identifies the protocol to be used by a Web browser for access to the page; "www.pc.ibm.com" identifies the target computer (this computer name is converted to its numeric-form Internet address); and "data.htm" identifies the page to be accessed on that computer. More complex examples having additional parameters are also possible, such that specific data may be passed from the client computer to the server computer in a URL specification.

For security reasons, Web Servers typically require a so-called "firewall" to prevent unauthorised access. A firewall is a set of related programs, located at a network gateway server, that protects the resources of a private network from non-authorised users. An enterprise with an intranet (a private network using Internet protocols) that allows its workers access to the wider Internet installs a firewall to prevent outsiders from accessing its own private data resources and for controlling what outside resources its own users have access to. An intranet can include an "extranet" which is the part of an intranet which is made accessible to authorised business partners.

A firewall, working closely with a router program, filters all network packets to determine whether to forward them toward their destination. A firewall also includes or works with a proxy server that makes network requests on behalf of workstation users. There are a number of known firewall screening methods, such as to screen requests to make sure they come from acceptable (previously identified) domain names and IP addresses. For mobile users, firewalls allow remote access to the private network by the use of secure logon procedures and authentication certificates.

With the increasing provision of electronic information and control units within vehicles, and also in the home, there is a requirement for a mechanism enabling remote computers to be able to access these electronic information and control units. For example, a car rental firm may wish to check the location of or status information relating to each of their cars from a computer at head office, and a car user may wish to set car climate controls from his home computer. Furthermore, there is a requirement for such a mechanism with sufficient security provision to prevent unauthorised access to control units in vehicles or in the home. However, the above-described resource access mechanism of a Web Browser connecting to a Web Server, and the Web Server implementing a firewall, cannot easily be implemented by installing a Web server in a car or in the home. This is because Web Servers require an administrator for ongoing maintenance as well as for initial set-up, and a firewall additionally requires continuous update and maintenance to watch its protocol files for unauthorised access attempts. Implementing a Web Server within a car would have unmanageable security problems. Similar problems exist in any wide area network.

DISCLOSURE OF INVENTION

The invention according to a first aspect provides a method for establishing communications between a first client computer and a server computer via a network, including the steps of: sending to the server computer from a second client computer remote from the first client computer a request for invocation of a communications controller component; in response to receipt of the request at the server computer, invoking the communications controller component at the server computer to generate and send a message from the server computer to the first client computer, the message including an identification of the communications controller component; in response to receipt of the message at the first client computer, sending a request from the first client computer to the communications controller component at the server computer, thereby to establish communications between the first client computer and the server computer.

In a preferred embodiment of the invention, the network is the Internet or an intranet. The second client computer includes a Web Browser for communicating with Web server software at the server computer and for displaying results to a user. The first client computer also includes software for handling communications with the Web server, and the requests sent to the server computer in response to the message received from the server computer use Internet protocols. Hereafter, the first client computer will be referred to as the 'Web client computer' and communications software at the second client computer will be referred to as the 'Web Browser'.

Thus, according to the preferred embodiment, a Web client computer is triggered to connect to a communication component at the Web server computer, initiated by a conventional interaction between a remote Web Browser and the Web server. The Web Browser request can specify particular required information or operations, causing the Web client to perform specific operations (downloading applets from the Web server if required) and/or to return operation results or information to the Web Browser via the Web server. The invention is particularly advantageous for enabling remote access to a vehicle's electronic control and information systems from a Web Browser without requiring a Web server to be running in the vehicle. The invention is also advantageous for remote access to electronic control and information systems in the home.

A Web client is not exposed to hacking in the way a Web server is, and so implementing a Web client in a vehicle (or in the home) avoids the security concerns that would be associated with running a Web server in the vehicle (or in the home). The Web client computer has control over whether or not to take any action in response to the messages it receives (for example, depending on the identity of the end user at the Browser) and it can control what level of access to its system resources it grants to code which it downloads from the server.

According to a preferred embodiment of the invention, the message sent to the Web client computer by the communications controller component is a short message service (SMS) message whereas the request sent from the client computer to the communications controller component in response to receipt of the SMS message uses Internet protocols. The SMS message is sent to a digital GSM telephone connected to the Web client computer. The acronym GSM stands for Global System for Mobile communication, and SMS is a known message service of the GSM system providing means for transferring short messages with limited length (160 ASCII characters) between mobile stations and a short message service server using the Short Message Transport Protocol (SM-TP). The SMS message preferably includes a URL or other identifier for identifying the communications controller component.

The present invention in a second aspect provides a data communications network including: a first network-connected client computer having installed thereon a decoder component for handling communications received by said first client computer from a server computer; a second network-connected client computer having installed thereon a communications component (e.g. a Web Browser) for handling communications with a server computer; a network-connected server computer having installed thereon a server communications component for handling communications between said server computer and said client computers; and wherein the server communications component is adapted to respond to a request from said second client computer (e.g. Web Browser requests) directed to said server communications component by generating and sending a message to the first client computer which message identifies the server communications component, and wherein the decoder component is adapted to respond to said message from the server communications component by causing a client request to be sent to the server communications component, thereby to establish communications between the first client computer and the server computer.

The present invention in a third aspect provides a set of components for use in a method of establishing client-server data communications between a client computer and a Web server computer within a computer network in response to initiation from a remote Web Browser within the network, the set of components including: a server communications component, for running on the Web server computer, adapted to respond to Web Browser requests directed to said server communications component by generating and sending messages to the client computer which messages identify the server communications component; and a decoder component for running on the client computer to respond to said messages from the server communications component by causing a client request to be sent to the server communications component using Internet protocols.

The server component and decoder component according to the invention may each be implemented as a computer program product comprising computer readable program code recorded on a storage medium.

The invention in a further aspect provides a vehicle including: electronic control systems and/or electronic information systems; a first computer connected to said electronic control systems and/or electronic information systems; said first computer including means for receiving messages from a remote Web server computer, means for processing received messages, and means for generating a connection request to said Web server computer in response to received messages, wherein said means for processing includes means for retrieving from said received messages information for identifying said Web server computer for use by said means for generating a connection request.

BRIEF DESCRIPTION OF DRAWINGS

A preferred embodiment of the present invention will now be described in more detail, by way of example, with reference to the accompanying drawings in which.

DETAILED DESCRIPTION OF PREFERRED EMBODIMENTS

Figure 1:
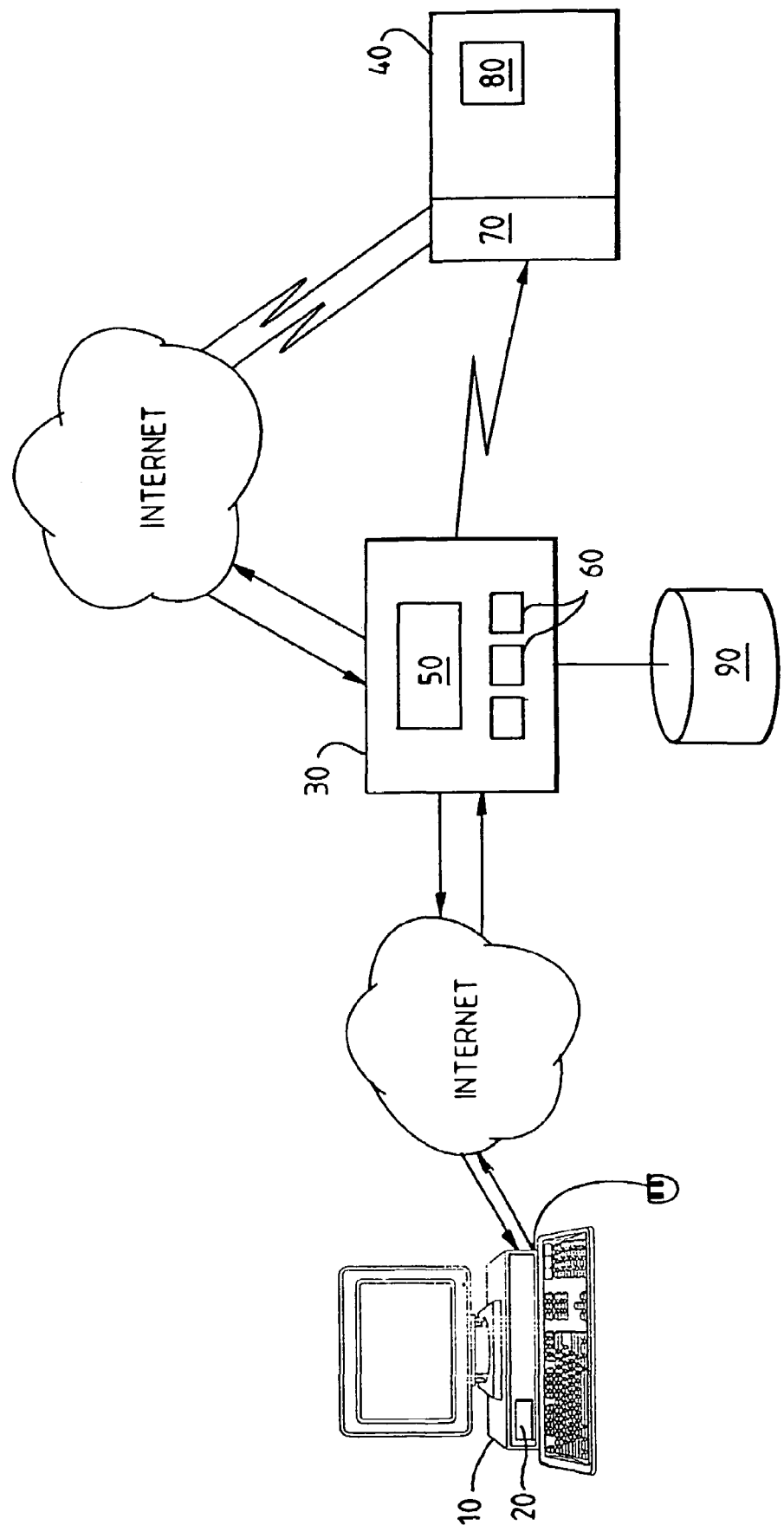
FIG. 1 is a schematic representation of a data communication network in which the present invention is implemented according to a first embodiment.
Figure 2:
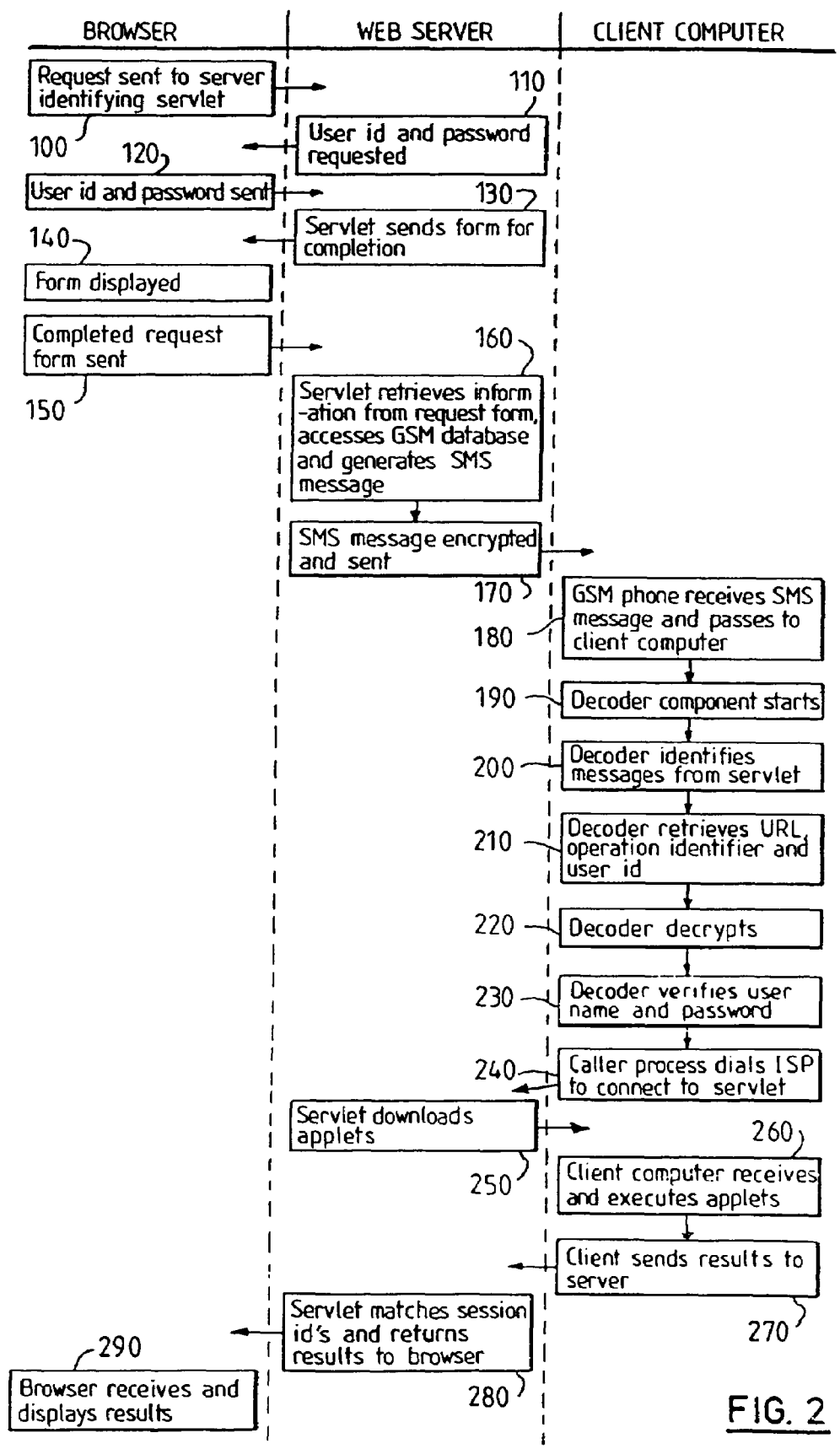
FIG. 2 is a representation of the sequence of communication flows and events according to an embodiment of the invention.

As shown in FIG. 1, the present invention according to a first embodiment is implemented in a network of computers including a first computer 10 having standard Web Browser software 20 installed thereon, a second computer 30 comprising a Web server computer, and a third computer 40 installed in a vehicle. The third computer 40 is connected to the vehicle's electronic control and information systems and manages those systems. Known vehicle control and information systems include engine and fuel management systems, navigation, telematic, communication and audio systems, security systems, and climate controls. The vehicle computer 40 may be connected via one or more communications buses to the vehicle's audio system, telephone 70, seat and mirror position controls, air conditioning, navigation system, etc. Each of the computers 10,30,40 are connected to the Internet (the vehicle computer 40 being connected to the Internet via a wireless link using the telephone 70 as receiver and transmitter). Vehicle computer 40 has installed thereon computer program code for sending and receiving communications to and from the Web server computer 30 and code 80 for processing incoming messages, as will be described below.

The Web server computer 30 has installed thereon a "servlet" 50 which is a server-based software component written in the Java programming language. This servlet 50 is a Java class which is referenced by a URL and performs services on the server computer on behalf of clients. The Java servlet 50, when invoked, runs persistently on the Web server computer 30 and supports multi-threading (i.e. multiple concurrent users are possible and a separate thread is created and maintained for each service request—the Web server assigns a session identifier to each new thread and stores this state information persistently to enable communications subsequently sent between the servlet and a client computer to be associated together). The operation of this servlet will be described below. The Web server additionally has a plurality of down loadable Java applets 60 stored thereon, each adapted to perform a different operation when executed by a client computer. It is known in the art for Java-enabled Web servers to support the Java Servlet API, and it is also known that servlets can handle multiple requests concurrently and can perform session tracking for HTTP servers.

An end user wishing to remotely access the vehicle's computer interacts with the Web Browser 20 to cause a request to be sent 100 from the Browser to the Web server computer 30. This initial request identifies the Java servlet 50. A typical URL to be included within the Web Browser request to reference the servlet 50 is:

http://www.ServerName.com/ServletA

The URL may be embedded in a Web page hyperlink so as to be selectable by the user by clicking the mouse button when the mouse pointer overlays the hyperlink hot spot, or the user may type in the URL via a keyboard.

The servlet 50 responds to this initial request by asking the end user to provide a user identifier (a Web page is sent 110 to the Web Browser for display to the user as a dialogue box requiring entry of the user's name and password). The Browser then returns 120 this information to the server. If the user's ID and password are recognised by the server, the server sends 130 to the Browser a second Web page which includes a form for completion. The Browser displays 140 the form to the user via its graphical user interface. The form includes an entry field for entering the licence/registration number of the vehicle to be contacted (or some other identifier for the client computer to be accessed) and includes menu options for specifying operations to be performed or information which is required.

Having entered the registration number and the purpose for which access to the vehicle computer is required, the user selects a "Proceed with request" option and the completed request form is transmitted 150 to the Web server 30 where it is recognised by the servlet 50 as a request for invocation of the servlet.

A new servlet thread is started in response to each invocation request. The servlet generates 160 a short message service (SMS) message for sending to the identified vehicle's GSM telephone, which is connected to the vehicle's computer 40. A telephone number for the vehicle's in car GSM telephone 70 is retrieved by the servlet 50 from a database 90 accessible from the Web server 30 (for example, stored in a peripheral disk storage device) for use in routing the SMS message. The SMS message includes the URL of the servlet 50, an identifier of a required operation to be performed, a session identifier assigned by the servlet 50 and an identifier of the user initiating the communications, to enable subsequent contact by the vehicle's computer 40 to the Web server 30. The SMS messages are encrypted at the server using known techniques, and then sent 170 to the identified GSM telephone.

Generation and transmission of SMS messages and the receipt and decoding of SMS messages by GSM telephones are well known in the art. SMS is a service of all GSM providers which allows short messages to be sent asynchronously to a receiving mobile telephone without the need to make a telephone call connection to that telephone. This "store and forward" service is cheap and efficient for transferring small amounts of information. WO98/11744 discloses sending short messages to and from mobile stations, including short messages containing a URL for identifying a desired Web page.

The vehicle's telephone 70 is connected to the vehicle's computer 40 (via an RS232 connector line), enabling the contents of a received SMS message to be passed 180 to the computer 40. A message arriving at the telephone toggles a line on the RS232 connector which is detected by a low-level device driver on the computer, which in turn triggers higher level software to communicate with the telephone and obtain the message from it as a stream of characters.

A software-implemented decoder component 80 on the vehicle's computer 40 is invoked 190 on receipt of an SMS message to decode their content. Firstly, this interpreter component must determine 200 whether a received SMS message contains a flag identifying itself as sent by the servlet 50. If not, the SMS message is routed to its target application (for example, text is displayed via the telephone's LCD display or is converted to speech and played). If the SMS message was sent by servlet 50, the decoder component 80 retrieves 210 from the message the user identifier, URL, and embedded operation identifier and password (if included) and decrypts them 220 using an appropriate stored decryption key. The decoder component 80 is provided with a register containing decryption keys for a number of authorised users who may initiate encrypted messages being sent and uses these to decrypt encrypted messages.

The decoder component 80 then performs a security check 230 against its own database using the user identifier included in the message (and the password if included), and determines whether to respond positively to the SMS message's request to make a connection to the servlet depending on this user identifier (and password) check. If this check is positive, the decoder component 80 invokes a process for establishing Internet access using the information retrieved from the message.

The telephone number of one or more Internet Service Providers (ISPs) is held by the vehicle's computer (If the vehicle holds only a single ISP number this is preferably for an ISP supporting local call charges regardless of the location of the requester).

The vehicle's computer then uses the telephone to call 240 an Internet service provider to establish a session and connect to the URL specified in the SMS message. The vehicle may have Global Positioning System (GPS) for determining its position and means for deciding which of a number of Internet Service Provider numbers to use based on relative costs, but this is not essential. Thus, the vehicle's Web client computer makes a connection using Internet protocols to the Java servlet 50 which was initially started by the Browser, returning the previously assigned session identifier and user identifier together with the required operation identifier. The vehicle's Web client identifies itself to the servlet by either a password or by its private security key.

Applets 60 which are required at the client computer to perform the specified required operation are then downloaded 250 from the Web server 30 to the vehicle's client computer 40. Thus, program code installed on the vehicle's computer 40 controls retrieval of Java applets from the Web server, to provide the vehicle's computer with functionality for issuing and receiving requests to and from the server's Java servlet 50 and for performing required operations. This dynamic downloading of code to provide required capabilities has the advantages of user flexibility (since new code can be added at any time) and of reducing the amount of code which must be permanently stored at the client computer. If the applets require access to the vehicle's electronic control units then it is desirable for these applets to be encrypted (or at least signed by digital electronic signature) such that only authorised users can make such requests, but encryption is not essential. The client computer then executes 260 the downloaded applets and results are returned 270 to the Web Browser via the servlet on the Web server, with the server matching up 280 session identifiers. The Browser then displays 290 the results to the user.

An example download applet has a method, begin Query( ), which accesses the software infrastructure within the vehicle. For example, the initial method may call:

CarSystems.FuelTank.getLevel( ) to determine the fuel level;

CarSystems.EngineManagement.getDiagnostics( ) for engine diagnostics;

CabinSystems.Heating.setTemp(20) to set the in-car air conditioning to 20 degrees C.;

CarSystems.EngineManagement.inhibitStart( ) to inhibit the next attempt to start the engine if the car has been stolen;

CarSystems.GPSmanagement.getPosition( ) to return the current location of the car from the Global Positioning system; or CabinSystem.MMIscreen.displayAlert(msg) to display an alert message on a screen in the car, which might direct the driver to call a telephone number, such as to call his own company.

Results of these queries are then processed and returned to the known servlet.

Thus, the remote Web Browser 20 is provided with secure access to the vehicle's client computer 40 via the Internet, using the vehicle's computer to make the Internet connection. This avoids the need for a Web server and firewall to be provided in the vehicle and vests control in the client, thereby improving security and reducing maintenance overheads. To further increase security, the URL's which can be used and/or the numbers for contacting Internet service providers are limited to a specific set of numbers stored in non-volatile storage in the vehicle.

Further examples of the advantages and applications of the present invention include:

enabling downloading to the Web client 40 new capabilities and information—such as adding new route information to a car's navigation system;

enabling a car owner to remotely instruct the car's computer to start recording traffic warnings half an hour before a journey, or to set climate controls;

enabling an authorised repair garage to check a car's diagnostic systems, to determine what repair is necessary before reaching the car;

enabling a car hire company to instruct a car to set itself to the next user's favorite settings (set seat and steering wheel positions, select radio channel, navigation system, Internet Browser, etc), or to check the locations of their cars.

For the above described embodiment of the invention which establishes communications between a mobile client and a server computer from a remote Browser, alternatives to SMS messaging such as wireless LAN or satellite communications are equally possible (although satellite communications are currently very much more expensive than SMS messaging and wireless LAN currently has a very limited range). These alternatives implementations also involve sending a message to the client computer without using Internet protocols (IP), and then the client computer being triggered to submit a request via IP.

Although the preferred embodiment described above relates specifically to use of the invention for providing remote access to a vehicle's computer, the present invention is equally applicable to remote access to a home computer for investigating or controlling electronic control systems in the home.

Example applications and advantages of the invention for access to home electronic control systems include:

checking of security systems;

setting of air conditioning/heating;

setting video recorder.

For home use, the cost savings of SMS messaging are less important since wired communication links may be used instead of mobile links. Any secure transmission which contains the requisite information for contacting the communications controller servlet 50 at the server computer would be acceptable. There would be no need to notify the home computer of the telephone number of an internet service provider, since this will remain fixed unless service providers were to be selected dynamically according to factors such as current charging rates.

The implementation of the present invention using a Java servlet installed on the Web server computer is not essential to the invention, although the known integrated security features and development efficiency of Java are beneficial and the handling of multiple concurrent requests and synchronisation which is possible with servlets are also beneficial. The above described embodiment involves applets being downloaded from the server as required, but in alternative embodiments some or all of this code can be fixed at the client.

Further alternative embodiments include SMS messages which do not include any identification of required operations or specify required information and instead merely identify the user (advantageous for security), the servlet, and the session. The client computer or the servlet must then determine what applets are to be downloaded to the client system based on the session identifier and/or user identifier. However, the SMS message could include more information, such as the telephone number of an ISP (for example, the nearest or cheapest as determined by the server instead of the vehicle's computer if the vehicle's position and call tariffs are known to the server).

The invention claimed is:

1. A method for establishing communications between a first client computer and a server computer via a network, including the steps of:
   sending to the server computer from a second client computer remote from the first client computer a request for invocation of a communications controller component, wherein the server is remote from the first client computer;
   in response to receipt of the request at the server computer, invoking the communications controller component at the server computer to generate and send a message from the server computer to the first client computer, the message including an identification of the communications controller component, wherein the message sent from the server computer to the first client computer is a SMS message generated by the communications controller component, said SMS message being sent to the first client computer via a GSM telephone connected to the first client computer, and wherein the SMS message is sent without establishing a two way telephone connection;
   in response to receipt of the message at the first client computer, sending a request from the first client computer to the communications controller component at the server computer, thereby to establish communications between the first client computer and the server computer, wherein the request from the first client computer to the communications controller component at the server computer uses Internet protocols to establish communications between the first client computer and the server computer.

2. A method according to claim 1 wherein the first client computer is installed in a vehicle and is connected to electronic control and/or information systems within the vehicle, enabling initiation from the second client computer of communications for controlling and/or interrogating the vehicle's electronic control and/or information systems.

3. A method according to claim 1, wherein the request sent from the second client computer specifies a required operation to be performed and/or required information to be retrieved and the message generated in response to receipt of the request from the second client computer includes an identification of the specified operation and/or information, the method including the steps, subsequent to establishing communications between the first client computer and the server computer, of sending information from the first client computer to the Server computer and forwarding said information to the second client computer.

4. A method according to claim 1, wherein the server computer includes Web server software and the first and second client computers each include software for communicating with the server computer using Internet protocols via the Internet or an intranet.

5. A method according to claim 4, wherein the message sent from the server computer to the first client computer includes a URL identifying the communications controller component.

6. A method according to claim 1, wherein the SMS message includes a URL identifying the communications controller component and wherein a component at the first client computer receives said SMS messages from the server computer, analyses the SMS messages to retrieve the respective URL, and uses the URL to generate a request for sending to the communications controller component at the server computer.

7. A method according to claim 1, wherein the communications controller component at the server computer is a Java servlet.

8. A method according to claim 1, including the step, subsequent to said request being sent from the first client computer to the server computer, of downloading Java applets from the server computer for performing at the first client computer operations specified in the request from the second client computer.

9. A method according to claim 1, wherein the request from the second client computer includes an identifier of an end user and/or a password and the message generated at the server computer includes said user identifier and/or password, and wherein the method includes performing a determination at the first client computer of whether to establish communications with the server computer, said determination being dependent on said user identifier and/or password.

10. A method according to claim 9, including the step of downloading Java applets from the server computer for performing operations at the first client computer, the selection of applets to be downloaded being performed at the fist client computer and being dependent on said user identifier and/or password.

11. A method according to claim 1, wherein the generation of the SMS message by the communications controller component includes the step of retrieving from a database accessible from the server computer a GSM telephone number of said GSM telephone.

12. A method according to claim 1, wherein the first client computer is a personal computer connected to electronic control and/or information systems within a user's home, enabling initiation from the second client computer of communications for controlling and/or interrogating the home electronic control and/or information systems.

13. A set of components for use in a method of establishing client-server data communications between a first client computer and a server computer within a computer network in response to initiation from a remote client computer within the network, the set of components including:

a server communications component, for running on the server computer, adapted to requests directed to said server communications component from remote client computer by generating and sending messages to the first client computer which messages identify the server communications component, wherein the messages are SMS messages generated by the communications controller component, said SMS messages being sent to the first client computer via a GSM telephone connected to the first client computer, and wherein the SMS messages are sent without establishing a two way telephone connection; and a decoder component for running on first client computer to respond to said messages from the server communications component causing a client request to be sent to server communications component, thereby to establish communications between the first client computer and the server computer, wherein the client request uses Internet protocols to establish communications between the first client computer and the server computer.

14. A set of components according to claim 13, wherein the server communications component is adapted to generate a form, for presentation via a graphical user interface of the remote client computer, enabling a user to specify required operations and/or required information to be included within said remote client requests, and wherein the server communications component is adapted to include an identification of said specified operations and/or information within said generated messages.

15. A set of components according to claim 14, wherein the decoder component is adapted to retrieve said identification of specified operations and/or information upon receipt of said messages, and wherein the set of components includes a set of applets for storing on the server computer such that they are down loadable to the first client computer in response to requests from said first client which include an identification of specified operations and/or information retrieved from said messages.

16. Apparatus for supporting remote access to a client computer, including:

a Web Browser for running on a first Internet or intranet-connected computer, to control the operation of said first computer;

a server component for running on a Web server component remote from the client computer comprising a second Internet or intranet-connected computer, to control the operation of said second computer; and decoder component for running on a client computer, to control the operation of said client computer;

wherein the server component is adapted to respond to Web Browser requests directed to said server component by generating and sending SMS messages to the client computer from said first client computer which messages identify the server component, and the decoder component is adapted to respond to said messages from the server component by causing a client request from said client computer to be sent to the server component using Internet protocols, thereby to establish communications between the client computer and the Web server computer.

17. Apparatus according to claim 16 wherein the decoder component is installed on a client computer connected to a vehicle's electronic control and/or information systems, and is adapted to communicate with the Web server computer via a wireless communication link.

18. A data communications network including:

a first network-connected client computer having installed thereon a decoder component for handling communications received by said first client computer from a server computer;

a second network-connected client computer having installed thereon a communications component for handling communications with a server computer;

a network-connected server computer remote from the first network-connected client computer having installed thereon a server communications component for handling communications between said server computer and said client computers; and wherein server communications component is adapted to respond to a request from said second client computer directed to said server communications component by generating and sending a SMS message to the first client computer in which message identifies the server communications component, and wherein the decoder component is adapted to respond to said SMS message from the server communications component by causing a client request from the first client computer to be sent to the server communications component, thereby to establish communications between the first client computer and the server computer, wherein the client request from the first client computer to the communications controller component at the server computer uses Internet protocols to establish communications between the first client computer and the server computer.

19. A method for establishing communications between a web client computer and a web server computer via a network, comprising:

causing, by interaction between a web browser computer remote from the web client computer and the web server computer remote from the web client computer, a request that identifies a servlet which is referenced by a Universal Resource Locator (URL) to be sent from the web browser computer to the web server computer by identification of the URL by an end user;

invoking the servlet at the web server computer, the servlet running persistently on the web server computer and supporting multi-threading;

in response to the request, requesting by the servlet a user identifier from the end user, the user identifier comprising a user name and a password;

verifying at the web server computer the user identifier;

upon verification of the user identifier, sending via a graphical user interface to the web browser computer a form for completion by the end user, the form including an entry field for entering a license/registration number of a vehicle having the web client computer to be contacted and menu options for specifying at least one of a required operation to be performed and information which is required;

upon completion of the form by the end user transmitting the form from the web browser computer to the web server computer, wherein the servlet of the web server computer recognizes the completed form as an invocation request of the servlet;

in response to the invocation request, starting a new servlet thread, the new servlet thread comprising a communications controller component;

retrieving from a database of the web server computer by the communications controller component a client telephone number of a digital Global System for Mobile communication (GSM) telephone of the vehicle, the GSM telephone being connected to the web client computer;

using the client telephone number to send from the communications controller component of the web server computer a short message service (SMS) message in a Short Message Transport Protocol (SM-TP) over a first wireless link to the web client computer located in the vehicle through a receiver of the GSM telephone connected to the web client computer, the SMS message including a communications controller component URL for identifying the communications controller component, a required operation identifier of the required operation to be performed, a session identifier assigned by the communications controller component and the user identifier of the end user, wherein the SMS message is sent without establishing a two way telephone connection;

decoding at the web client computer, a content of the SMS message using encryption keys, the decoding for determining whether the SMS message was sent by the communications controller component;

in response to a determination that the SMS message was sent by the communications controller component, determining using the user identifier of the end user whether to respond positively to the SMS message;

in response to a determination to respond positively to the SMS message, invoking a process for establishing internet access over a second wireless link by retrieving an Internet Service Provider (ISP) telephone number from the web client computer and using the ISP telephone number to establish a session and a connection to the communications controller component using an identifier of the web client computer and information of the SMS message, the information including the communications controller component URL, the session identifier, the user identifier and the required operation identifier, wherein the second wireless link enables two-way communications between the web client computer and the communications controller component;

downloading from the web client computer applets from the web server computer, the applets being required to perform the required operation specified by the required operation identifier;

executing the applets to perform the required operation; and returning results to the web browser computer via the servlet of the web server computer, wherein the network is the internet, wherein the web client computer is connected to and manages electronic control and information systems of the vehicle, wherein the electronic control and information system includes an engine system, a fuel management system, a navigation system, a telematic system, a communication system, an audio system, a security system, a telephone system, a seat position control system, a mirror position control system, and a climate control system, wherein the required operation comprises an operation selected from the group consisting of: adding new capabilities to the web client computer, adding new information to the web client computer, retrieving information from the web client computer, recording traffic warnings beginning at a specified time, setting climate controls, providing diagnostic information, setting a seat position, setting a steering wheel position, setting a mirror position, selecting a radio channel, configuring a navigation system, checking a security system, providing fuel level information, displaying an alert message in the vehicle, starting the vehicle, inhibiting an attempt to start the vehicle and providing a location of the vehicle, and wherein the web client computer has control over whether or not to take any action in response to the SMS message and can control a level of system resources access granted to the applets that are downloaded from the web server computer, and wherein the web browser computer is provided with secure access to the client computer without the web client computer including any of a web server and a firewall.

* * * * *